US012579129B2

(12) United States Patent
Veerman et al.

(10) Patent No.: US 12,579,129 B2
(45) Date of Patent: Mar. 17, 2026

(54) SYSTEM AND METHOD FOR PROCESSING HIERARCHICAL DATA

(71) Applicant: The Toronto-Dominion Bank, Toronto (CA)

(72) Inventors: Christiaan Veerman, Toronto (CA); Steven Bodnar, Toronto (CA); Thomas Herren, Toronto (CA); Norma Cabildo Valles, Whitby (CA); Arash Kayedpour, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/249,488

(22) Filed: Mar. 3, 2021

(65) Prior Publication Data

US 2022/0284009 A1     Sep. 8, 2022

(51) Int. Cl.
*G06F 16/23* (2019.01)
*G06F 3/0482* (2013.01)

(52) U.S. Cl.
CPC ........ *G06F 16/2379* (2019.01); *G06F 3/0482* (2013.01)

(58) Field of Classification Search
CPC ........................... G06F 16/2379; G06F 3/0482
USPC ........................................................ 707/703
See application file for complete search history.

(56) References Cited

U.S. PATENT DOCUMENTS 7,467,157 B1 * 12/2008 Chen ..................... G06F 40/143
                                                      707/999.102
7,644,089 B2   1/2010 Stewart et al.

7,984,014 B2   7/2011 Song et al.
8,271,531 B2   9/2012 Karlsen et al.
8,631,021 B2   1/2014 Palmer et al.
9,804,747 B2   10/2017 Schmitlin et al.
10,332,132 B2   6/2019 Briere et al.
10,719,799 B1 * 7/2020 Harris .............. G06Q 10/06398
10,789,572 B2   9/2020 Creager et al.
11,256,659 B1 * 2/2022 Gu ........................ G06F 16/144
2006/0143194 A1 * 6/2006 Stewart .................. G06Q 10/06
2006/0247944 A1 * 11/2006 Calusinski ............. G06Q 40/00
                                                      705/1.1

(Continued)

FOREIGN PATENT DOCUMENTS

IN    201911035357    9/2019

*Primary Examiner* — Amy Ng
*Assistant Examiner* — Antonio J Caiado
(74) *Attorney, Agent, or Firm* — CPST Intellectual Property Inc.; Brett J. Slaney; Amy Scouten

(57) ABSTRACT

A system and method are provided for processing hierarchical data. The method includes receiving a first set of data from a plurality of sources, each source providing data records for entities in an organizational hierarchy processing the first set of data to generate a preliminary data file for the entities by combining the data records to populate fields in the data file and receiving a second set of data from at least one additional source, each additional source providing additional data records for the entities. A hierarchical connectivity platform may use machine learning to analyze the data. The second set of data is processed to update missing fields in the preliminary data file, for the entities, to generate an output data file comprising a list of the entities in the hierarchy with the associated data fields for each entity; and providing the output data file to a platform.

20 Claims, 12 Drawing Sheets

(56)　　　　References Cited

U.S. PATENT DOCUMENTS

| | | | |
|---|---|---|---|
| 2008/0183841 A1* | 7/2008 | Isokawa | H04L 63/10 |
| | | | 709/217 |
| 2009/0222298 A1* | 9/2009 | Atmaja | G06Q 10/067 |
| | | | 705/348 |
| 2010/0238023 A1 | 9/2010 | Kahn et al. | |
| 2011/0004622 A1* | 1/2011 | Marson | G06Q 10/06 |
| | | | 707/812 |
| 2011/0184962 A1* | 7/2011 | Palmer | G06F 7/00 |
| | | | 707/754 |
| 2012/0092157 A1* | 4/2012 | Tran | G16H 80/00 |
| | | | 340/539.12 |
| 2013/0110565 A1* | 5/2013 | Means, Jr. | G06Q 10/063 |
| | | | 705/7.11 |
| 2013/0332891 A1* | 12/2013 | Schmitlin | G06Q 10/10 |
| | | | 715/853 |
| 2014/0122142 A1* | 5/2014 | Podgurny | G06Q 50/40 |
| | | | 705/7.13 |
| 2014/0282098 A1* | 9/2014 | McConnell | G06Q 10/0639 |
| | | | 715/753 |
| 2015/0040049 A1* | 2/2015 | Vierich | G06F 16/283 |
| | | | 715/764 |
| 2015/0317574 A1* | 11/2015 | Hull | G06Q 10/067 |
| | | | 705/348 |
| 2017/0024531 A1 | 1/2017 | Malaviya | |
| 2017/0046638 A1* | 2/2017 | Chan | H04L 63/061 |
| 2017/0169075 A1* | 6/2017 | Jiang | G06F 3/061 |
| 2017/0209102 A1 | 7/2017 | Parthasarathy et al. | |
| 2018/0329794 A1* | 11/2018 | Prieto | G06F 11/3006 |
| 2019/0129910 A1* | 5/2019 | Skellenger | G16H 50/30 |
| 2019/0132400 A1 | 5/2019 | Platt et al. | |
| 2019/0222560 A1* | 7/2019 | Ford | H04W 12/06 |
| 2019/0251858 A1* | 8/2019 | Baharav | G09B 5/08 |
| 2020/0057965 A1* | 2/2020 | Howard | A61P 25/28 |
| 2020/0175043 A1* | 6/2020 | Hughes | G06N 5/04 |
| 2020/0302452 A1 | 9/2020 | Platt et al. | |
| 2020/0320212 A1 | 10/2020 | Kaminski et al. | |
| 2020/0342414 A1 | 10/2020 | Smith | |
| 2021/0035116 A1* | 2/2021 | Berrington | G06N 5/04 |
| 2021/0373982 A1* | 12/2021 | Neilson | G06F 9/546 |
| 2022/0103598 A1* | 3/2022 | Vaidya | H04L 45/586 |
| 2022/0172169 A1* | 6/2022 | Carzoli | G06Q 10/1091 |
| 2023/0044523 A1* | 2/2023 | Ashford | G06Q 50/205 |
| 2023/0224023 A1* | 7/2023 | Kang | H04B 7/18573 |
| | | | 375/262 |

* cited by examiner

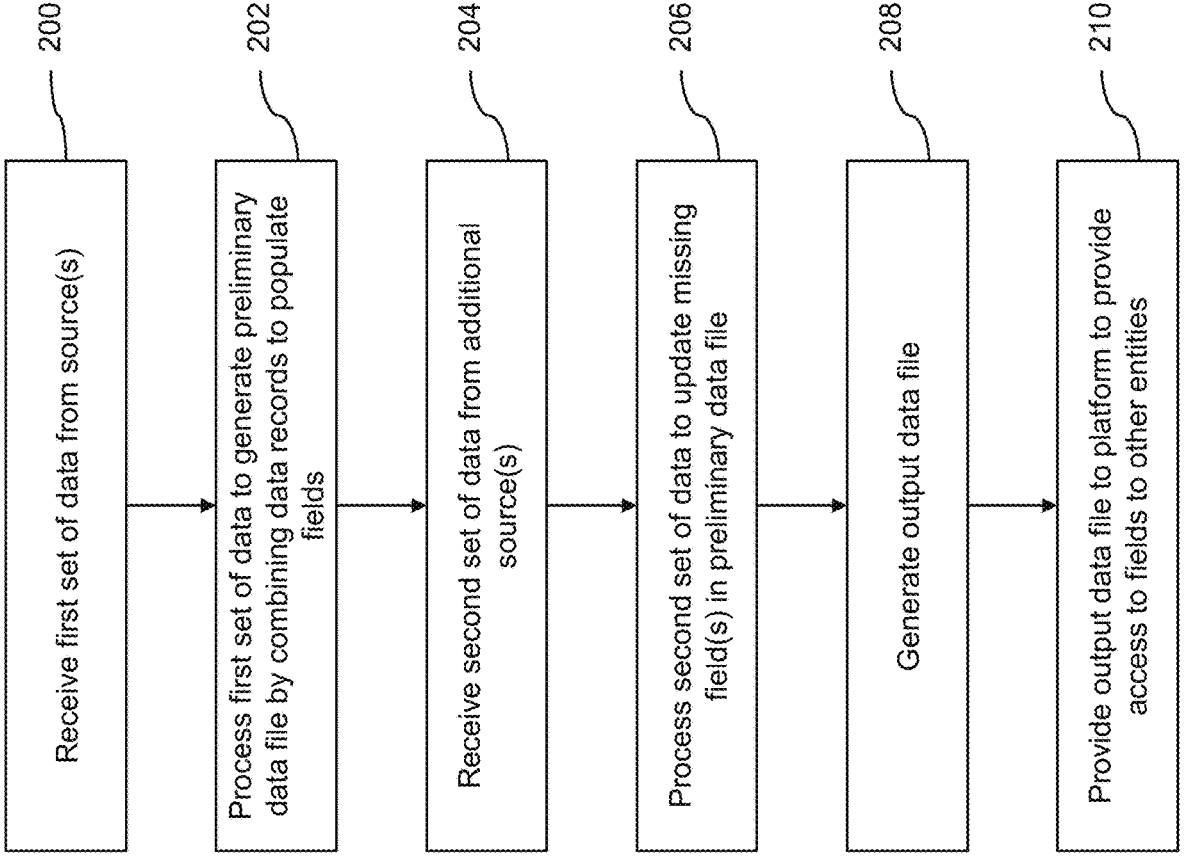

200 — Receive first set of data from source(s)

202 — Process first set of data to generate preliminary data file by combining data records to populate fields 204 — Receive second set of data from additional source(s)

206 — Process second set of data to update missing field(s) in preliminary data file 208 — Generate output data file 210 — Provide output data file to platform to provide access to fields to other entities

FIG. 12

SYSTEM AND METHOD FOR PROCESSING HIERARCHICAL DATA

TECHNICAL FIELD

The following relates generally to processing hierarchical data.

BACKGROUND

When providing platforms or services for tracking employee locations and providing employee details, most solutions cater to anonymity and to protecting the user's privacy. While this is often desired or required for regulatory or other constraints, there is often a need to provide a more consistent, comprehensive and accurate set of data for an employee, including, for example, their location.

This need has been heightened by an increase in work from home and other remote working arrangements wherein various factors from time zones to contact tracing can become important. Other issues can arise like natural disasters such that accounting for employees and their well-being and safety can become more difficult in non-traditional working environments. Moreover, employee data is often only comprehensively captured during an onboarding process and can become stale or out-of-date over time.

BRIEF DESCRIPTION OF THE DRAWINGS

Embodiments Will Now be Described with Reference to the Appended Drawings Wherein:

FIG. 12 is a flow diagram of an example of computer executable instructions for processing hierarchical data.

DETAILED DESCRIPTION

Figure 1:
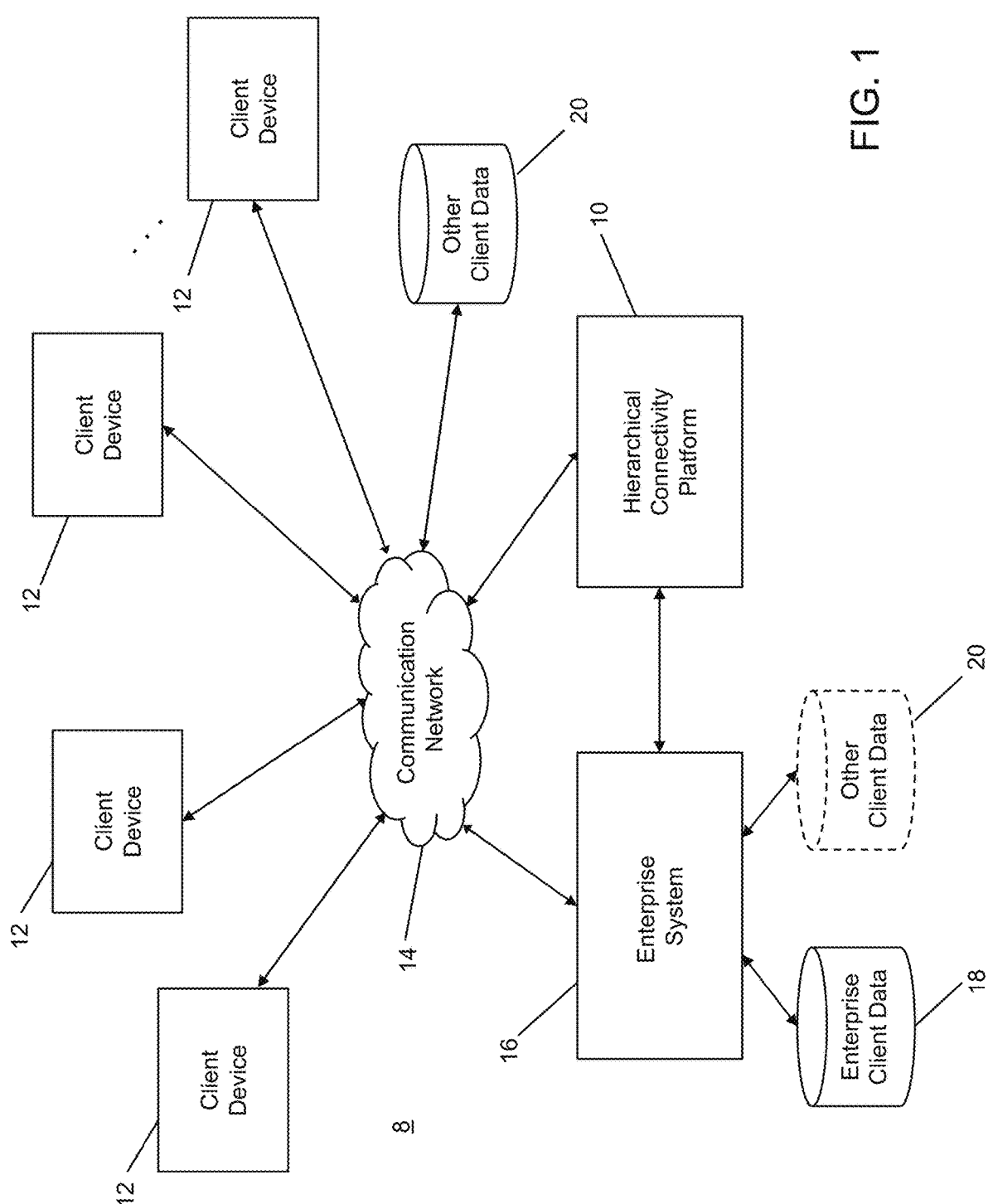
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Described herein is a digital platform for employees or other members or entities of an organization that processes hierarchical data by wrangling, scraping and cleansing data to provide a single source of truth about the employee, member or entity. By considering hierarchical data associated with the organization, connectivity between entities and within the organization can also be visualized and leveraged for location services, contact tracing, natural disaster tracing and/or other applications relevant to an organizational hierarchy and such connectivity.

The platform can provide a graphical user interface (GUI) and various tools to help keep teams connected and to provide a single source of truth for these employees. This allows accurate assessments of hierarchies and compositions of teams to be tracked and observed and permits the aforementioned applications to be implemented. By having employees opt in to provide their current location, a real-time view of an organization and where the employees are working can be immediately accessible.

The platform combines both core data (e.g., client data kept by an enterprise) and other client data or metadata (e.g., locations, pronouns, roles, teams, badges, etc.), gathers and cleanses this data to provide a comprehensive and consistent GUI for each employee.

The data gathering or "wrangling" process can be periodically performed, e.g., in alignment with onboarding processes used by human resources, accounting or other departments. The information entered into these records are cleansed and combined with data scraped from other systems available within the organization or available externally to the organization. The combined data becomes a master list that is consistent and normalized and provided to the platform for consumption, e.g., by providing the aforementioned GUI.

It will be appreciated that while examples provided herein are directed to employees of a commercial enterprise, the principles discussed herein equally apply to other organizations such as government workforces, military organizations, educational institutions, charities, etc.

Certain example systems, platforms, devices, and methods described herein are able to process hierarchical data. In one aspect, there is provided a device for process hierarchical data. The device includes a processor, a communications module coupled to the processor, and a memory coupled to the processor. The memory stores computer executable instructions that when executed by the processor cause the processor to receive a first set of data from a plurality of sources via the communications module, each source providing data records for entities in an organizational hierarchy. The memory also stores computer executable instructions that when executed by the processor cause the processor to process the first set of data to generate a preliminary data file for the entities by combining the data records to populate fields in the data file; and receive a second set of data from at least one additional source via the communications module, each additional source providing additional data records for the entities. The memory also stores computer executable instructions to cause the processor to process the second set of data to update missing fields in the preliminary data file, for the entities, to generate an output data file comprising a list of the entities in the hierarchy with the associated data fields for each entity; and provide the output data file via the communications module to a platform providing access to fields associated with the entities to other entities in the organizational hierarchy.

In another aspect, there is provided a method of processing hierarchical data. The method is executed by a device having a communications module. The method includes receiving a first set of data from a plurality of sources via the communications module, each source providing data records for entities in an organizational hierarchy. The method also includes processing the first set of data to generate a preliminary data file for the entities by combining the data records to populate fields in the data file; and receiving a second set of data from at least one additional source via the communications module, each additional source providing additional data records for the entities. The method also includes processing the second set of data to update missing fields in the preliminary data file, for the entities, to generate an output data file comprising a list of the entities in the hierarchy with the associated data fields for each entity; and providing the output data file via the communications module to a platform providing access to fields associated with the entities to other entities in the organizational hierarchy.

In another aspect, there is provided a non-transitory computer readable medium for processing hierarchical data. The computer readable medium includes computer executable instructions for receiving a first set of data from a plurality of sources via a communications module, each source providing data records for entities in an organizational hierarchy. The computer readable medium also includes computer executable instructions for processing the first set of data to generate a preliminary data file for the entities by combining the data records to populate fields in the data file; and receiving a second set of data from at least one additional source via the communications module, each additional source providing additional data records for the entities. The computer readable medium also includes computer executable instructions for processing the second set of data to update missing fields in the preliminary data file, for the entities, to generate an output data file comprising a list of the entities in the hierarchy with the associated data fields for each entity; and providing the output data file via the communications module to a platform providing access to fields associated with the entities to other entities in the organizational hierarchy.

In certain example embodiments, the device can have the platform generate and display a user interface for the entities to access and view the fields associated with the entities in the organizational hierarchy. The device can also receive input data from an entity in the organizational hierarchy via the communications module, entered using a profile in the user interface for the entity; and update the profile for the entity. The input data can include location data associated with the entity. The device can also have the platform provide a visualization of at least a portion of the organizational hierarchy with location data input by a plurality of the entities.

In certain example embodiments, the device can receive additional data associated with either or both the first data set and the second data set via the communications module; and update the output data file by processing the additional data.

In certain example embodiments, the first set of data can be provided by a plurality of departments in an enterprise comprising the organizational hierarchy; and the second set of data can be gathered from a source not associated with one of the plurality of departments in the enterprise. The second set of data can be obtained from publicly available sources. The second set of data can be organized by a sub-hierarchy with the enterprise that is not associated with one of the plurality of departments.

In certain example embodiments, the device can enable entities to enter location data associated with premises in which they are working.

In certain example embodiments, the device can have the platform display at least one badge in the user interface to recognize an attribute, qualification, or achievement associated with the entity, each badge being assigned by an enterprise comprising the organizational hierarchy.

FIG. 1 illustrates an exemplary computing environment 8. In one aspect, the computing environment 8 may include a hierarchical connectivity platform 10, one or more client devices 12, and a communications network 14 connecting one or more components of the computing environment 8.

The computing environment 8 may also include an enterprise system 16 (e.g., a financial institution such as commercial bank and/or insurance provider) that provides financial services accounts to users and processes financial transactions associated with those financial service accounts. While several details of the enterprise system 16 have been omitted for clarity of illustration, reference will be made to FIG. 6 below for additional details.

The enterprise system 16 includes or otherwise has access to a datastore for storing enterprise client data 18 and a datastore for storing "other" client data 20. The other client data 20 can include data available to or via the enterprise system 16 that is in addition to the enterprise client data 18. For example, the other client data 20 can include team, intranet, messaging, committee, or other client- or relationship-based data not controlled by certain processes within the enterprise client data 18 such as through human resources, information technology (IT), payroll, finance, etc. As shown in FIG. 1, the other client data 20 can also include any additional data source within the computing environment 8, for example, social media, publicly accessible repositories or other sources for which permission and access to such data is implied or consented to by the user. In this way, the hierarchical connectivity platform 10 can wrangle and combine multiple data sources including traditional or existing channels embedded within the enterprise system 16 as well as other available sources either within the enterprise environment or via a public source.

The hierarchical connectivity platform 10 may have has access to the enterprise client data 18 via the enterprise system 16. The hierarchical connectivity platform 10 may also have access to the other client data 20 via the enterprise system 16 or by direct access (including access via the network 14). The enterprise client data 18 may include both data associated with a user of a client device 12 that interacts with the hierarchical connectivity platform 10 and the enterprise system 16 (e.g., an employee or other user within or associated with an organization associated with the enterprise system 16). It can be appreciated that such employees or other users may also be consumers or customers of the enterprise system 16 (e.g., a commercial bank) and thus the enterprise client data 18 (or other client data 20) can also include transaction history data that is captured and provided with a transaction entry, e.g., in the graphical user interface of a mobile or web-based banking application. The data associated with a user can include client profile data that may be mapped to corresponding financial data 96 (see FIG. 6) for that user. It can be appreciated that the financial data 96 shown in FIG. 6 could also include transaction data and/or can be part of or include the enterprise client data 18 shown in FIG. 1 and these datastores are shown separately for illustrative purposes. The enterprise client data 18 can include both data that is associated with a client as well as data that is associated with one or more user accounts for that client as recognized by the computing environment 8.

The data associated with a client may include, without limitation, demographic data (e.g., age, gender, income, location, etc.), preference data input by the client, and inferred data generated through machine learning, modeling, pattern matching, or other automated techniques. The enterprise client data 18 or other client data 20 may also include historical interactions and transactions associated with the hierarchical connectivity platform 10 and/or enterprise system 16, e.g., login history, search history, communication logs, documents, etc.

Figure 6:
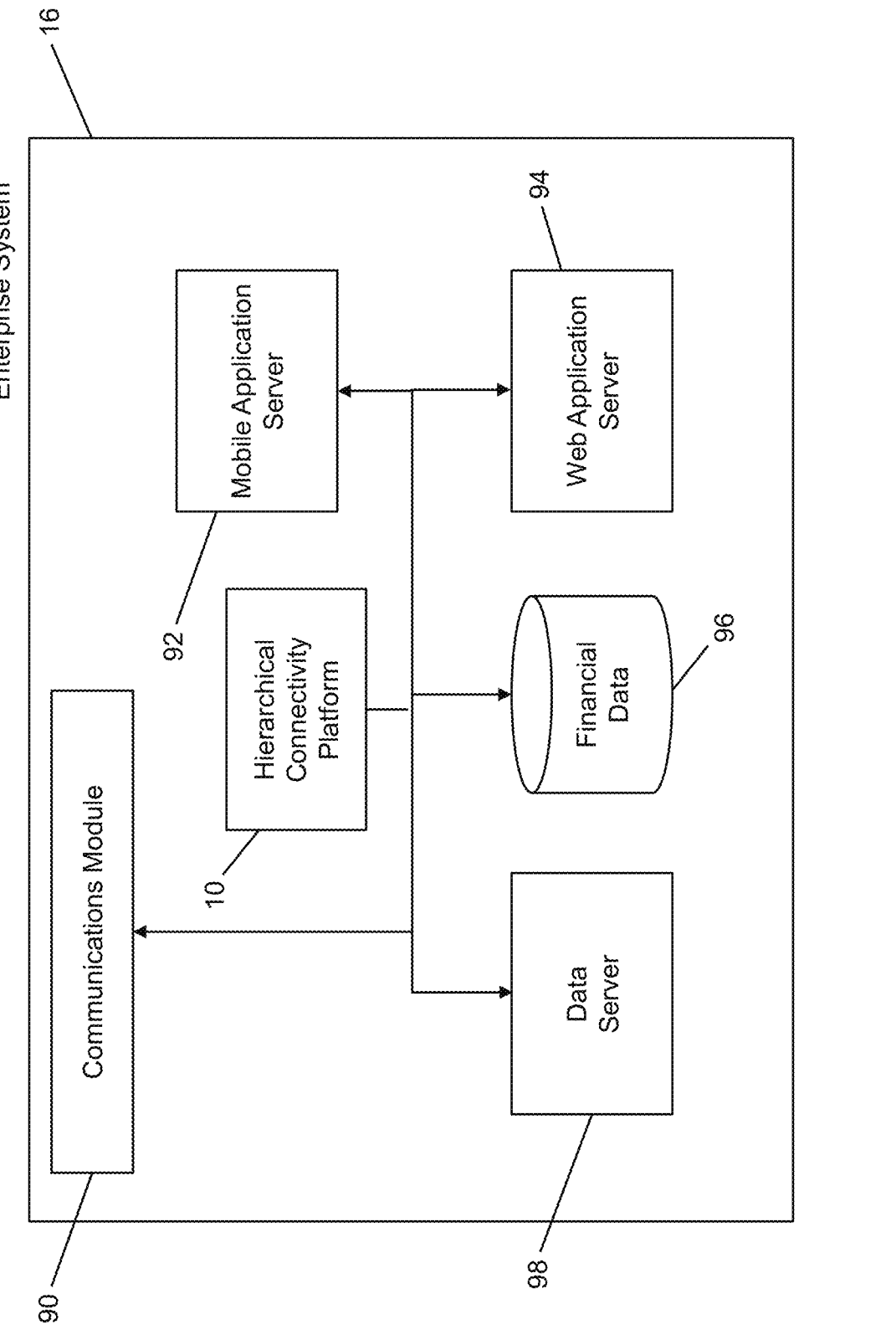
FIG. 6 is a block diagram of an example configuration of an enterprise system.

It can be appreciated that while the hierarchical connectivity platform 10 and enterprise system 16 are shown as separate entities in FIG. 1, they may also be part of the same system. For example, the hierarchical connectivity platform 10 can be hosted and provided within the enterprise system 16 as illustrated in FIG. 6.

Client devices 12 may be associated with one or more users. Users may be referred to herein as employees, customers, clients, consumers, correspondents, or other entities that interact with the enterprise system 16 and/or hierarchical connectivity platform 10 (directly or indirectly). The computing environment 8 may include multiple client devices 12, each client device 12 being associated with a separate user or associated with one or more users. In certain embodiments, a user may operate client device 12 such that client device 12 performs one or more processes consistent with the disclosed embodiments. For example, the user may use client device 12 to engage and interface with enterprise applications as well as mobile or web-based applications provided by the enterprise system 16, which is provided within or is complementary to the hierarchical connectivity platform 10 to combine and present data that provides a single source of truth for a particular user. In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of client devices 12. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In one embodiment, hierarchical connectivity platform 10 may be one or more computer systems configured to process and store information and execute software instructions to perform one or more processes consistent with the disclosed embodiments. In certain embodiments, although not required, hierarchical connectivity platform 10 may be associated with one or more business entities. In certain embodiments hierarchical connectivity platform 10 may represent or be part of any type of business entity. For example, the hierarchical connectivity platform 10 may be a system associated with a commercial bank (e.g., enterprise system 16), a digital media service provider, or some other type of business having multiple sources of data pertaining to individuals such as employees. The hierarchical connectivity platform 10 can also operate as a standalone entity that is configured to serve multiple business entities, e.g., to act as an agent therefor.

Referring again to FIG. 1, the hierarchical connectivity platform 10 and/or enterprise system 16 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the hierarchical connectivity platform 10 and enterprise system 16. The cryptographic server may be used to protect the financial data 96 and/or enterprise client data 18 and/or other client data 20 by way of encryption for data protection, digital signatures or message digests for data integrity, and by using digital certificates to authenticate the identity of the users and client devices 12 with which the enterprise system 16 and/or hierarchical connectivity platform 10 communicates to inhibit data breaches by adversaries. It can be appreciated that various cryptographic mechanisms and protocols can be chosen and implemented to suit the constraints and requirements of the particular deployment of the hierarchical connectivity platform 10 or enterprise system 16 as is known in the art.

Figure 2:
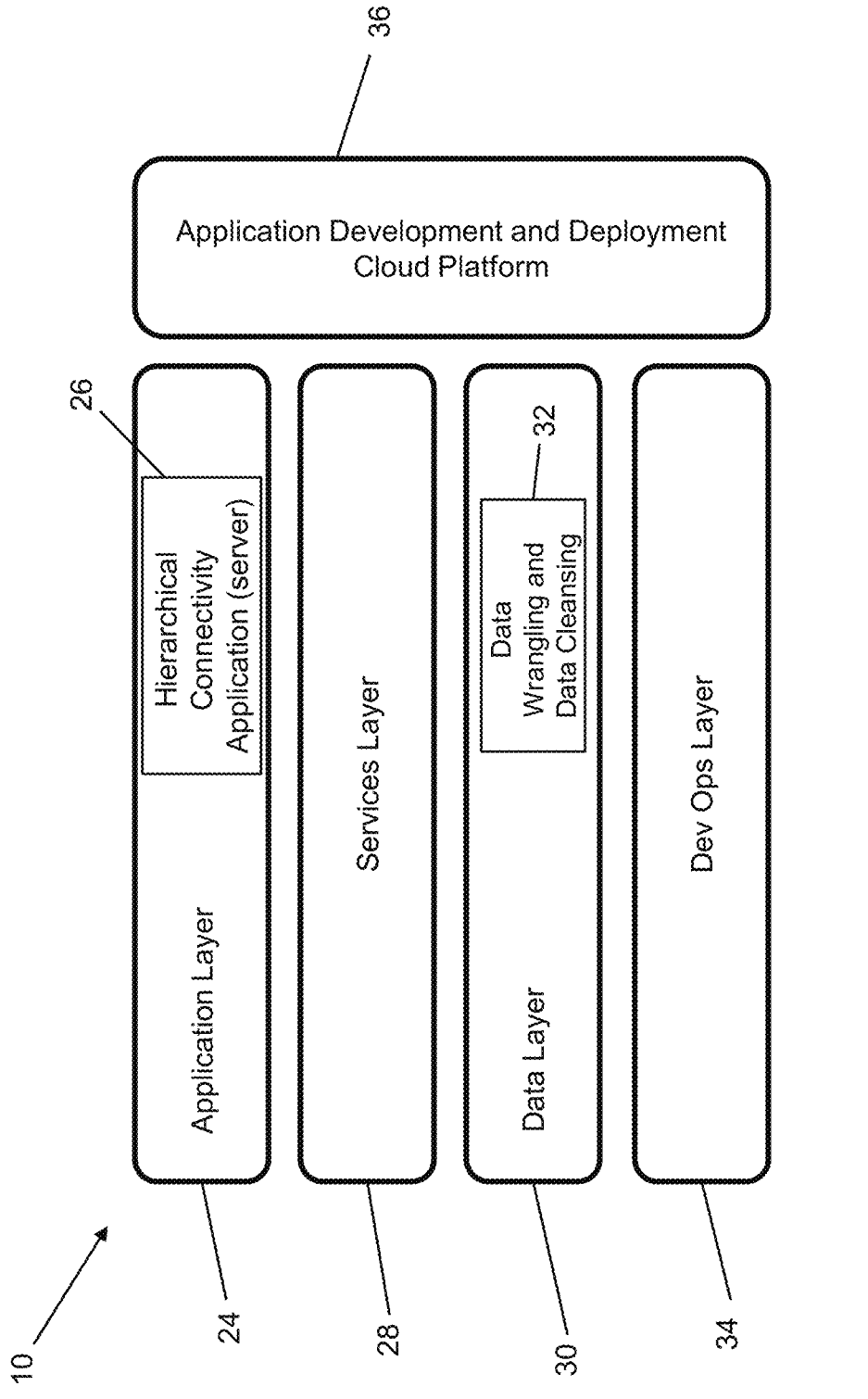
FIG. 2 is a block diagram of an example of a technology stack for implementing a hierarchical connectivity platform.

FIG. 2 provides a schematic illustration of a technology stack for the hierarchical connectivity platform 10. In this technology stack, the hierarchical connectivity platform 10 includes an application layer 24, a services layer 28, a data layer 30, and a dev ops layer 34. In this example embodiment, the layers are integrated with an application development and deployment cloud platform 36 such as Microsoft Azure®. The application layer 24 includes and provides access to a server-based hierarchical connectivity application 26, which can be used to provide a single source of truth for data corresponding to entities in an organizational hierarchy such as one associated with the enterprise system 16. The data layer 30 in this example includes a data wrangling and data cleansing module 32, which may also be referred to herein as a "data cleansing module 32". The data cleansing module 32 can be used to gather or "wrangle" data from a variety of different sources and source types and combine this data into data files associated with the entities in the hierarchy. The combined data can include not only data concerning the entity or individual, but also hierarchical data that enables the hierarchical connectivity application 26 to connect teams of individuals and provide functions and tools that take this hierarchical data into account, for example, location tracking and "checking in" from remote locations.

Figure 3:
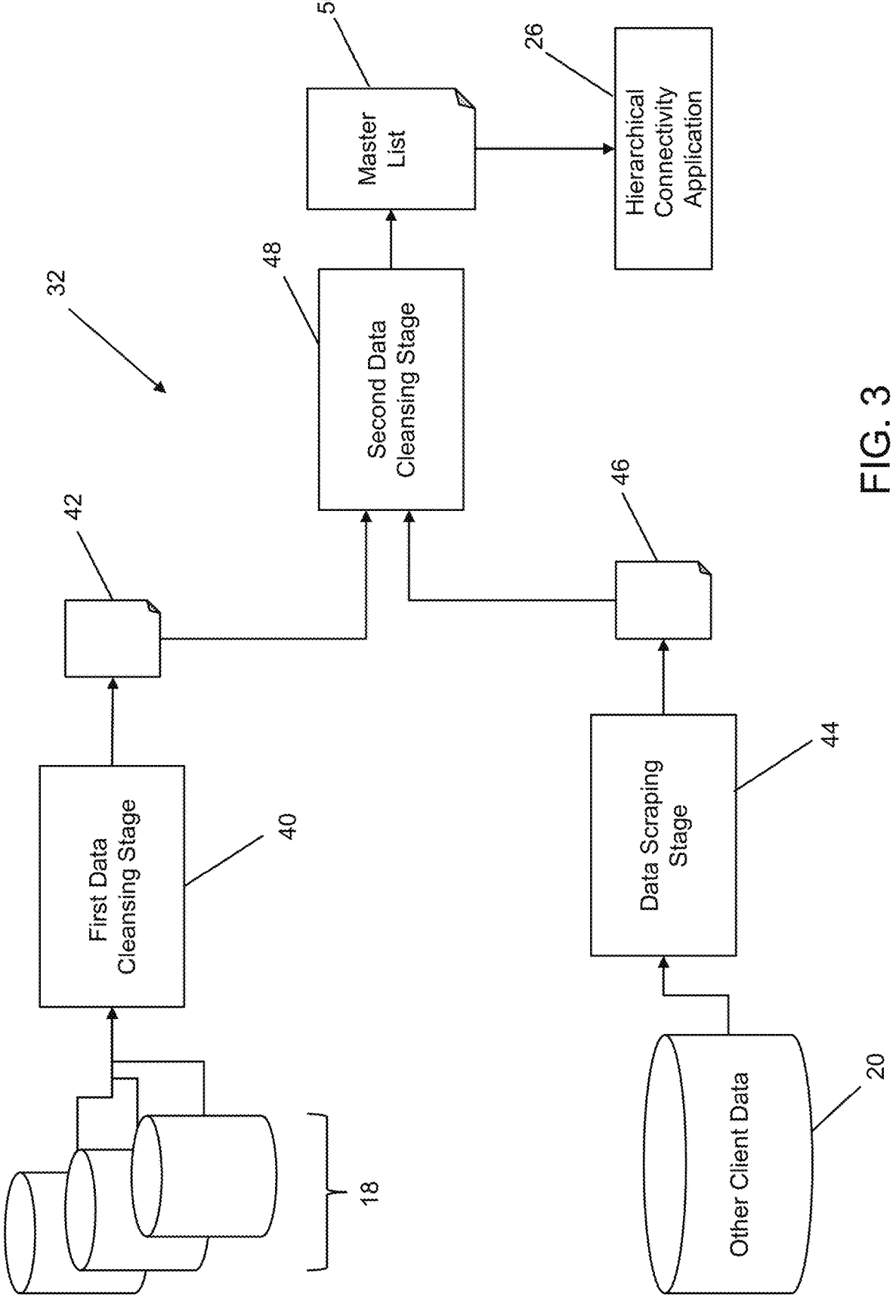
FIG. 3 is a schematic diagram illustrating a data wrangling and data cleansing process.

FIG. 3 provides a schematic flow diagram of a data wrangling process that can be implemented by the data cleansing module 32 using data obtained from multiple sources, in this example the enterprise client data 18 and one or more sources of "other" client data 20. The enterprise client data 18 can include existing data obtained from established records and processes such as onboarding processes. For example, the enterprise client data 18 can be obtained in native or raw formats from human resources, technology or finance departments in an organization. Each file obtained from these departments can provide data this is unique to that file and can be used in a first data cleansing stage 40, which provides a workflow to combine and clean the data from these data files through a set of joins and unions. One suitable data cleansing workflow can be implemented using automated analytics software provided by Alteryx™. Such analytics software can be used to provide an intuitive tool that allows data engineers to visualize the data cleaning work process, facilitating debugging, and manipulation of data through visual tools.

A preliminary output file 42 is then generated, which is found to often have missing data, empty fields or otherwise requires additional relevant user data. To obtain such relevant user data, a data scraping stage 44 can be implemented using a tool such as Python™. The data scraping stage 44 can utilize one or more sources of secondary or "other" client data 20 from sources within or external to the organization depending on availability, permissions, security, etc. The data scraping can generate an additional data file 46 that can be combined with the preliminary data file 42 in a second data cleansing stage 48 to generate a master list 50. As such, it can be appreciated that the data cleansing stages 40, 48 and data scraping stage 44 can include multiple users or be repeated for multiple users such that the master list 50 includes a collection of users that can be accounted for in the hierarchical connectivity application 26.

Figure 4:
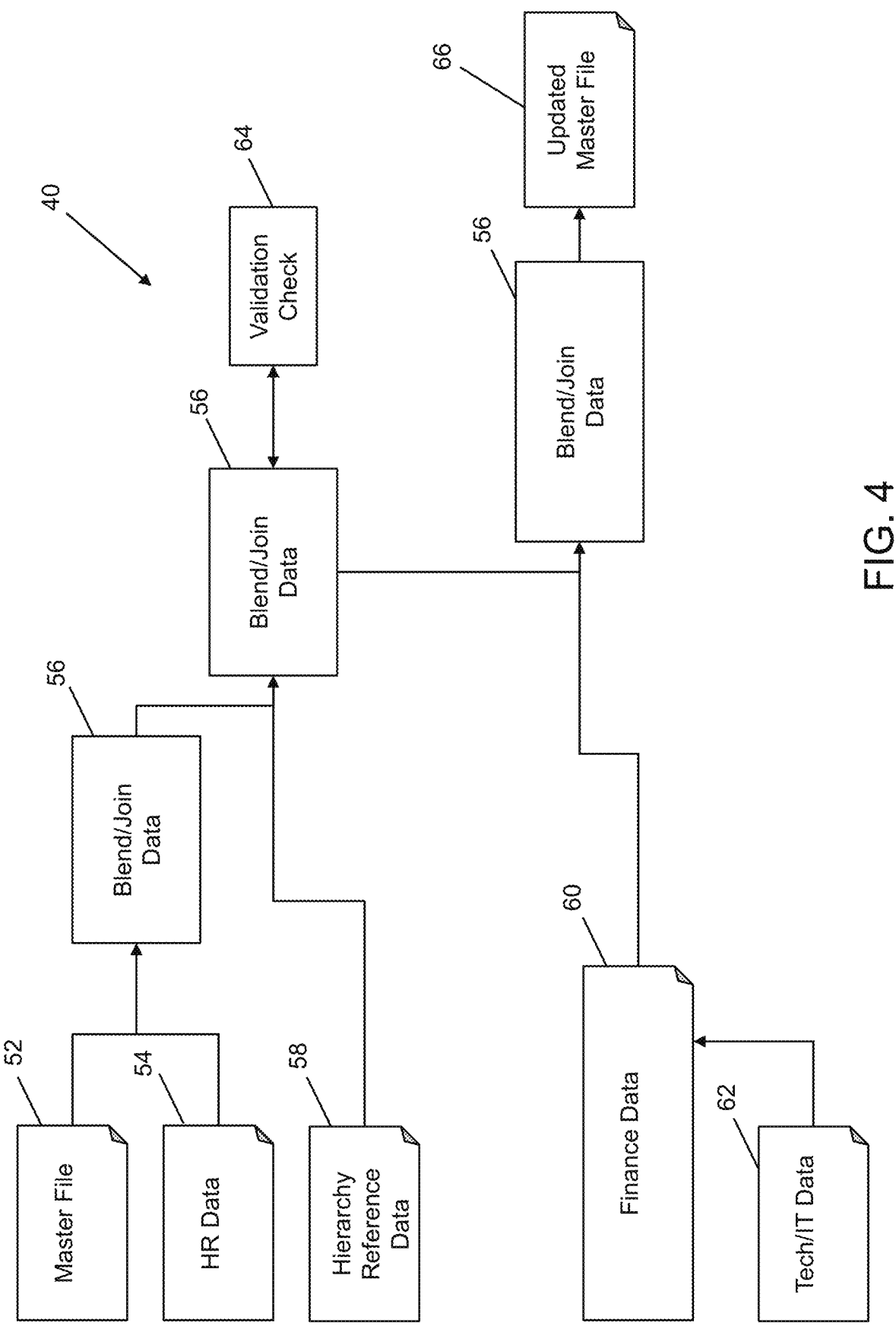
FIG. 4 is a schematic diagram illustrating an example of a data cleansing stage for processing enterprise client data.

FIG. 4 provides a schematic flow diagram of an example of a workflow for implementing the first data cleansing stage 40. In this example, it is assumed that a master file 52 exists (or can be created) for an individual and can be updated to wrangle or combine multiple sources of enterprise client data 20 to update the master file 52 and generate an updated master file 66 that can be further augmented with other client data 20 scraped from at least one additional source as shown in FIG. 3. The master file 52 can be created or designed to include any number of fields desired by the organization to provide a complete and holistic view of each individual and their attributes. In this example, human resources (HR) data 54 is blended or joined with the master file 52 at stage 56. This blended data is then blended or joined with hierarchy reference data 58 at stage 56. In this way, relationships and other characteristics unique to the organization relative to other individuals, departments, etc. can be built into the updates being applied to the master file 52. A validation check 64 can also be applied to manually or otherwise separately confirm the accuracy of the blended/joined data. In this example, additional finance data 60, which can include tech/IT data 62 is further blended or joined at stage 56 to generate the updated master file 66. As such, it can be seen that any number of blending or joining operations can be performed to insert, augment or layer on data from a variety of data sources from within the organization. It can be appreciated that in the second data cleansing stage 48, a similar approach can be taken to absorb and consume the data scraped from the "other" sources. For example, the organization may have an internal messaging or social network application that includes additional metadata, relationships, awards, recognitions, personal details, etc. that can be augmented with more traditional data to build the aforementioned single source of truth for each individual.

Figure 5:
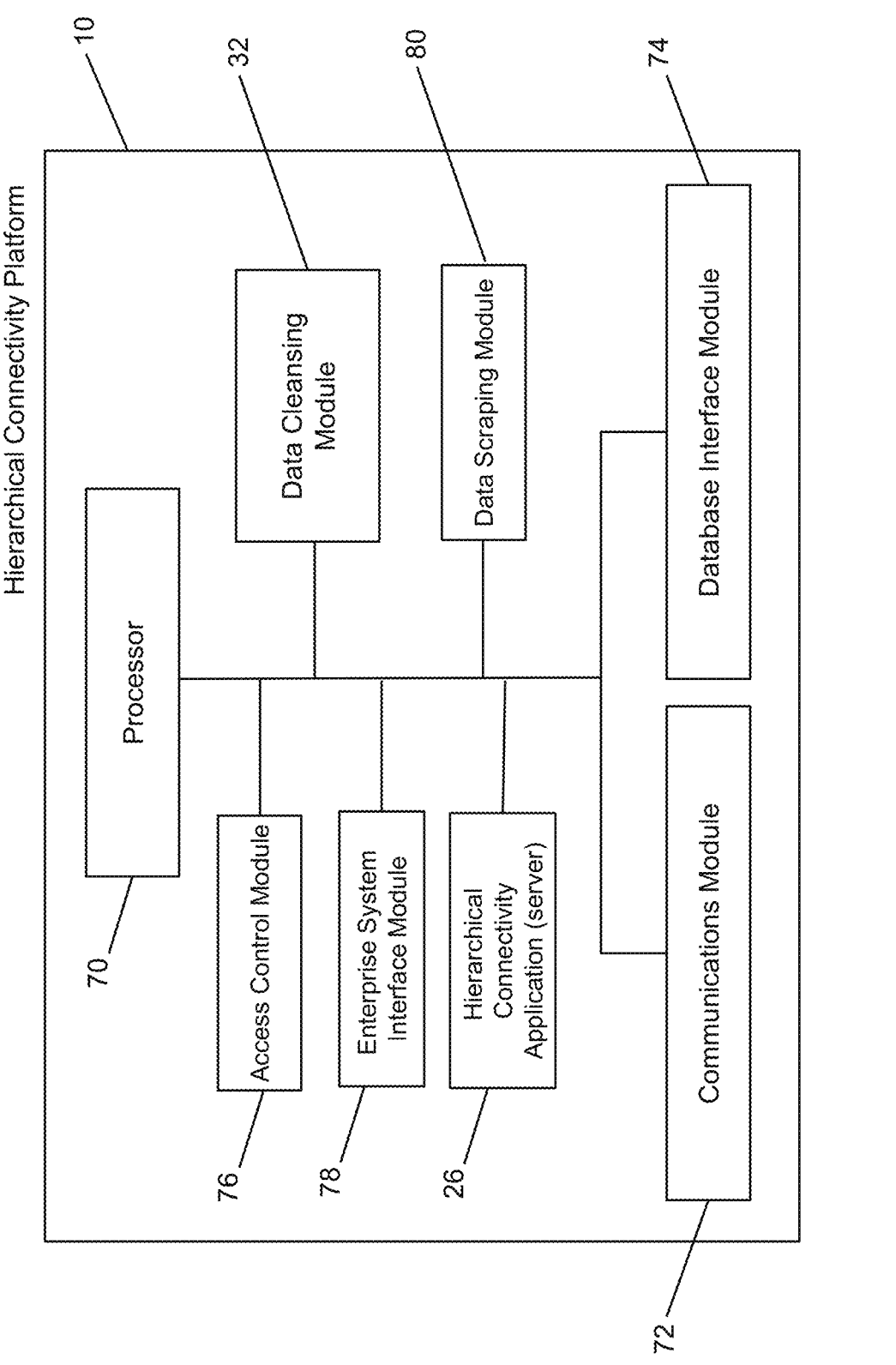
FIG. 5 is a block diagram of an example configuration of a hierarchical connectivity platform.

In FIG. 5, an example configuration of the hierarchical connectivity platform 10 is shown. In certain embodiments, the hierarchical connectivity platform 10 may include one or more processors 70, a communications module 72, and a database interface module 74 for interfacing with the datastores of the enterprise client data 18 and/or the other client data 20 (and if permitted financial data 96) to retrieve, modify, and store (e.g., add) data. Communications module 72 enables the hierarchical connectivity platform 10 to communicate with one or more other components of the computing environment 8, such as client device 12 (or one of its components), via a bus or other communication network, such as the communication network 14. While not delineated in FIG. 5, the hierarchical connectivity platform 10 includes at least one memory or memory device that can include a tangible and non-transitory computer-readable medium having stored therein computer programs, sets of instructions, code, or data to be executed by processor 70. FIG. 5 illustrates examples of modules, tools and engines stored in memory on the hierarchical connectivity platform 10 and operated by the processor 70. It can be appreciated that any of the modules, tools, and engines shown in FIG. 5 may also be hosted externally and be available to the hierarchical connectivity platform 10, e.g., via the communications module 72. In the example embodiment shown in FIG. 5, the hierarchical connectivity platform 10 includes an access control module 76, the data cleansing module 32, the hierarchical connectivity (server) application 26, an enterprise system interface module 78, and a data scraping module 80.

While not shown in FIG. 5, it can be appreciated that the hierarchical connectivity platform 10 can also include, a machine learning module and recommendation engine to enable the hierarchical connectivity platform 10 to analyze the enterprise client data 18 or other client data 20 to determine which data should be wrangled and combined and how such data should be combined, e.g., according to a trained model. Such a recommendation engine may utilize or otherwise interface with the machine learning engine to both classify data currently being analyzed to generate a suggestion or recommendation, and to train classifiers using data that is continually being processed and accessed by the hierarchical connectivity platform 10. This can result in a trained model used by the hierarchical connectivity platform 10 to perform such operations.

The access control module 76 may be used to apply a hierarchy of permission levels or otherwise apply predetermined criteria to determine what enterprise client data 18, other client data 20, or financial data 96 can be shared with which entity in the computing environment 8. For example, the hierarchical connectivity platform 10 may have been granted access to certain sensitive enterprise client data 18, other client data 20, or financial data 96 for a user, which is associated with a certain client device 12 in the computing environment 8. Similarly, certain client profile data stored in the enterprise client data 18, other client data 20, or financial data 96 may include potentially sensitive information such as age, date of birth, or nationality, which may not necessarily be needed by the hierarchical connectivity platform 10 to execute certain actions. As such, the access control module 76 can be used to control the sharing of certain client profile data or other transaction data and/or enterprise client data 18 or other client data 20 and/or financial data 96 based on a type of client/user, a permission or preference, or any other restriction imposed by the computing environment 8 or application in which the hierarchical connectivity platform 10 is used.

The hierarchical connectivity platform 10 may also include the data cleansing module 32 described above to initiate and execute data wrangling and data cleansing operations to generate a single source of truth data for a user such as an employee of the enterprise system 16. The hierarchical connectivity platform 10 also includes the data scraping module 80 to initiate and execute a data scraping operation to collect relevant "other" client data 20 as illustrated above.

The hierarchical connectivity platform 10 may also include or host the server-side hierarchical connectivity application 26 that enables employees to access and visualize the combined hierarchical data. The hierarchical connectivity application 26 may also interface with or be integrated into the enterprise system interface module 78 to permit a seamless integration with existing user interfaces and tools associated with the enterprise system 16.

The enterprise system interface module 78 can provide a GUI or API connectivity to communicate with the enterprise system 16 to obtain enterprise client data 18, other client data 20 (if applicable), and financial data 96 for a certain user (see FIG. 6). It can be appreciated that the enterprise system interface module 78 may also provide a web browser-based interface, an application or "app" interface, a machine language interface, etc.

In FIG. 6, an example configuration of the enterprise system 16 is shown. The enterprise system 16 includes a communications module 90 that enables the enterprise system 16 to communicate with one or more other components of the computing environment 8, such as client device 12 (or one of its components) or hierarchical connectivity platform 10, via a bus or other communication network, such as the communication network 14. While not delineated in FIG. 6, the enterprise system 16 includes at least one memory or memory device that can include, a tangible and non-transitory computer-readable medium having stored therein computer programs, sets of instructions, code, or data to be executed by one or more processors (not shown for clarity of illustration). FIG. 6 illustrates examples of servers and datastores/databases operable within the system 16. It can be appreciated that any of the components shown in FIG. 6 may also be hosted externally and be available to the system 16, e.g., via the communications module 90.

In the example embodiment shown in FIG. 6, the enterprise system 16 includes one or more servers to provide access to the enterprise client data 18 (which may include or be included with the financial data 96 or stored separately as shown in FIG. 1) and, if applicable, at least one source of "other" client data 20; to the hierarchical connectivity platform 10, to enable the hierarchical connectivity platform 10 to interface with existing components, services, departments, and lines of business implemented by the enterprise system 16. Exemplary servers utilized by the enterprise system 16 include a mobile application server 92, a web application server 94 and a data server 98. Although not shown in FIG. 6, as noted above, the enterprise system 16 may also include a cryptographic server for performing cryptographic operations and providing cryptographic services. The cryptographic server can also be configured to communicate and operate with a cryptographic infrastructure. The enterprise system 16 may also include one or more data storages for storing and providing data for use in such services, such as data storage for storing financial data 96.

Mobile application server 92 supports interactions with a mobile application installed on client device 12. Mobile application server 92 can access other resources of the enterprise system 16 to carry out requests made by, and to provide content and data to, a mobile application on client device 12. In certain example embodiments, mobile application server 92 supports a mobile banking application.

Web application server 94 supports interactions using a website accessed by a web browser application 112 (see FIG. 7) running on the client device 12. It can be appreciated that the mobile application server 92 and the web application server 94 can provide different front endpoints for the same application, that is, the mobile (app) and web (browser) versions of the same application. For example, the enterprise system 16 may provide a banking application that be accessed via a smartphone or tablet app while also being accessible via a browser on any browser-enabled device.

The financial data 96 may be associated with users of the client devices 12 (e.g., employees and/or customers of a financial institution). The financial data 96 may include any data related to or derived from financial values or metrics associated with customers of the enterprise system 16, for example, account balances, transaction histories, line of credit available, credit scores, mortgage balances, affordability metrics, investment account balances, investment values and types, insurance policies, insurability metrics, among many others. Other metrics can be associated with the financial data 96, such as financial health data that is indicative of the financial health of the users of the client devices 12. As indicated above, it can be appreciated that the enterprise client data 18 shown in FIG. 1 may include or be part of the financial data 96 stored and maintained by the enterprise system 16 and is shown separately for ease of illustration and ease of reference herein.

Figure 7:
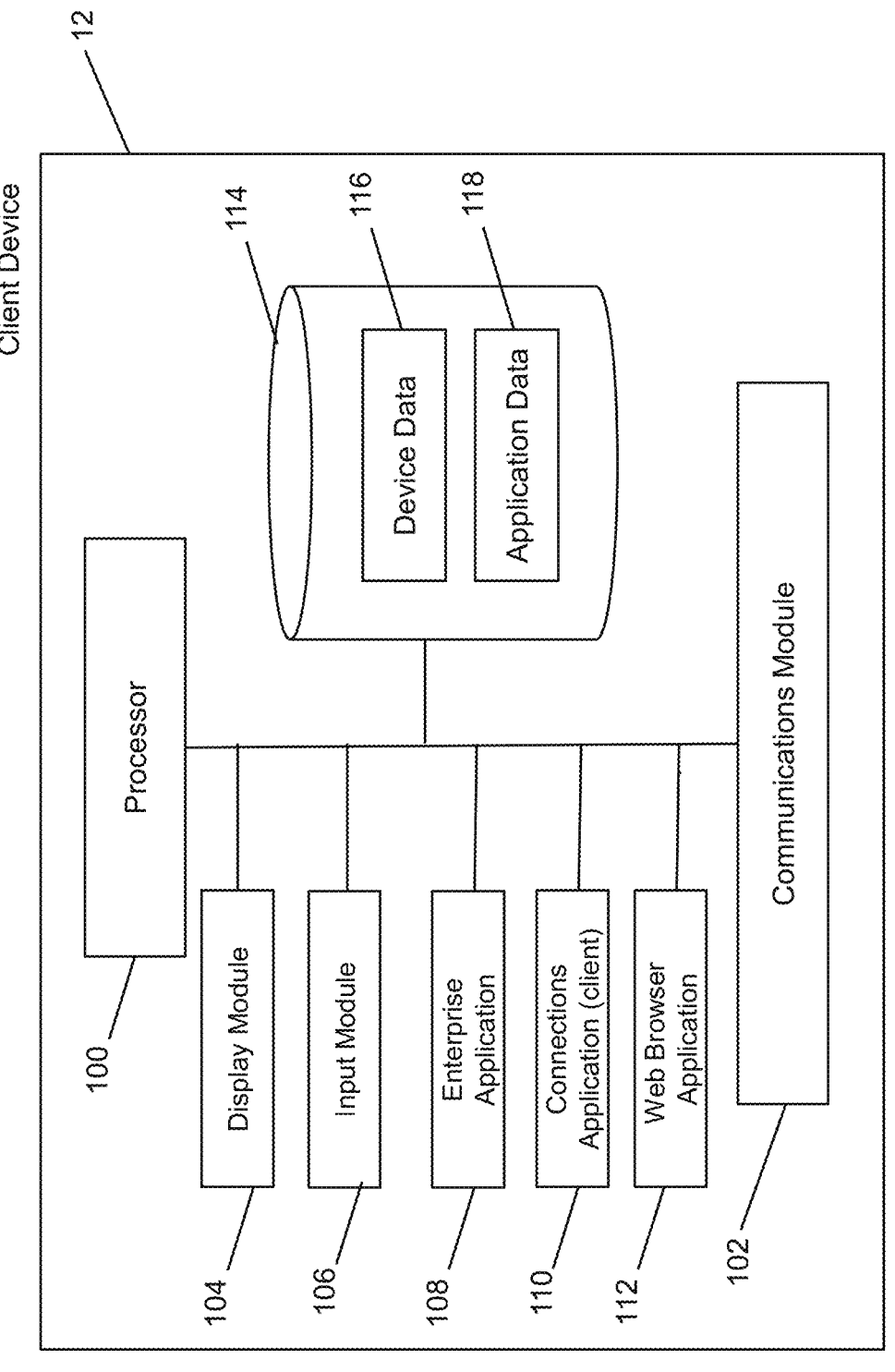
FIG. 7 is a block diagram of an example configuration of a client computing device associated with a user, customer, or client.

In FIG. 7, an example configuration of the client device 12 is shown. In certain embodiments, the client device 12 may include one or more processors 100, a communications module 102, and a data store 114 storing device data 116 and application data 118. Communications module 102 enables the client device 12 to communicate with one or more other components of the computing environment 8, such as the hierarchical connectivity platform 10 or enterprise system 16, via a bus or other communication network, such as the communication network 14. While not delineated in FIG. 7, the client device 12 includes at least one memory or memory device that can include a tangible and non-transitory computer-readable medium having stored therein computer programs, sets of instructions, code, or data to be executed by processor 100. FIG. 7 illustrates examples of modules and applications stored in memory on the client device 12 and operated by the processor 100. It can be appreciated that any of the modules and applications shown in FIG. 7 may also be hosted externally and be available to the client device 12, e.g., via the communications module 102.

In the example embodiment shown in FIG. 7, the client device 12 includes a display module 104 for rendering GUIs and other visual outputs on a display device such as a display screen, and an input module 106 for processing user or other inputs received at the client device 12, e.g., via a touchscreen, input button, transceiver, microphone, keyboard, etc. The client device 12 may also include an enterprise application 108 provided by the enterprise system 16. e.g., for performing mobile insurance, banking, or other financial product or services. The client device 12 in this example embodiment also includes a web browser application 112 for accessing Internet-based content, e.g., via a mobile or traditional website. In this example, the client device 12 also includes a connections application 110, which corresponds to a client-based application to access and interface with the hierarchical connectivity application 26 hosted by the hierarchical connectivity platform 10.

The data store 114 may be used to store device data 116, such as, but not limited to, an IP address or a MAC address that uniquely identifies client device 12 within environment 8. The data store 114 may also be used to store application data 118, such as, but not limited to, login credentials, user preferences, cryptographic data (e.g., cryptographic keys), etc.

It will be appreciated that only certain modules, applications, tools and engines are shown in FIGS. 2 to 7 for ease of illustration and various other components would be provided and utilized by the hierarchical connectivity platform 10, enterprise system 16, and client device 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in hierarchical connectivity platform 10 or enterprise system 16, or client device 12, or accessible or connectable thereto. Any application or module herein described may be implemented using computer readable/executable instructions that may be stored or otherwise held by such computer readable media.

Figure 8:
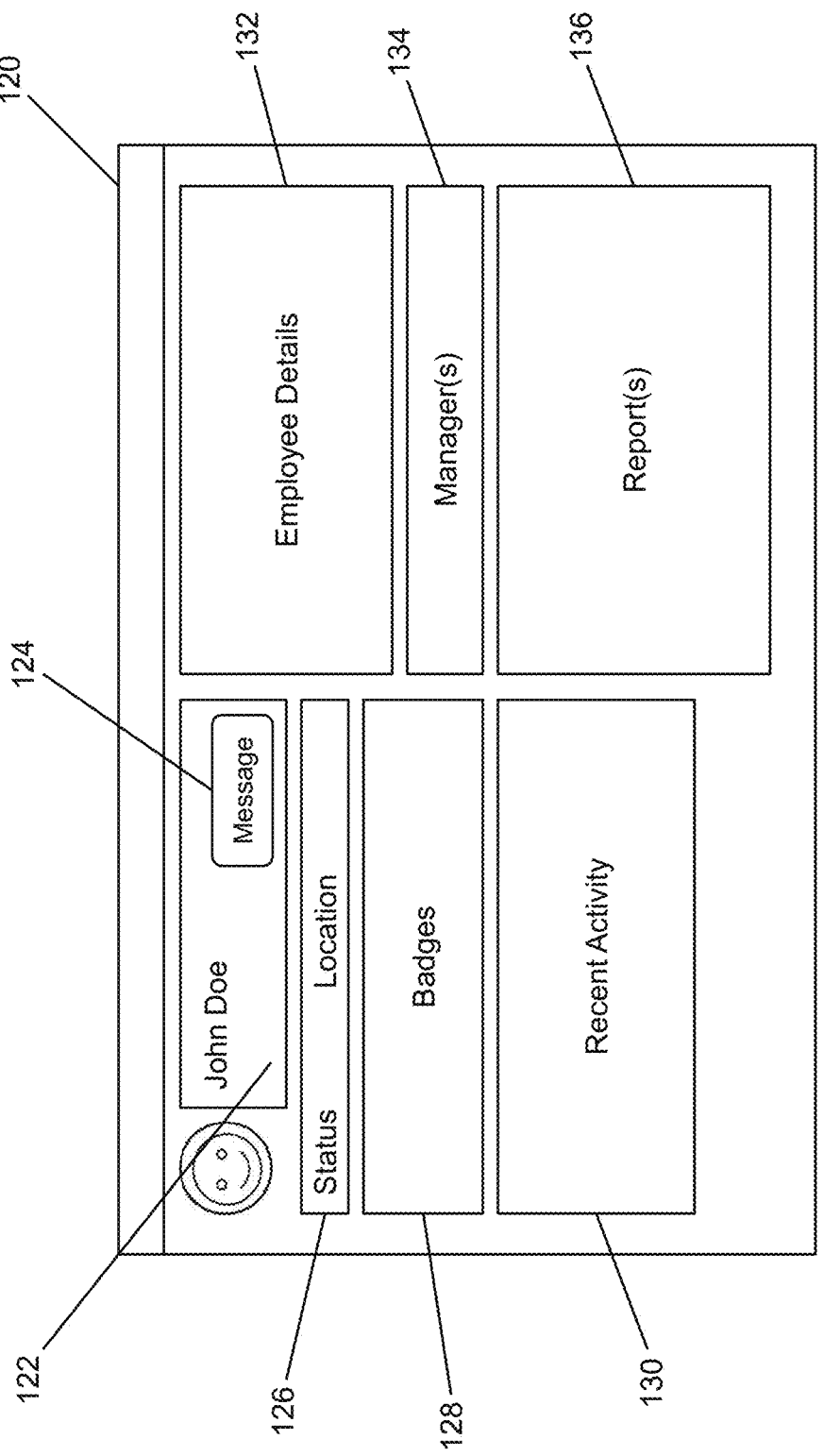
FIG. 8 is an example of a graphical user interface for an employee dashboard.

Turning now to FIG. 8, a screen shot 120 of an example of a GUI for the connections application 110 is shown. The connections application 110 can be used to provide a dashboard or landing page in which a status, activities and details of an individual (such as an employee) can be displayed and interacted with. In this example, the screen shot 120 for the connections application 110 includes a name and/or employee identifier 122 and a message button 124 to enable another individual viewing the page provided in this screen shot 120 to send this employee a message. That is, the screen shot 120 is an example of a landing page for employees to obtain information associated with other employees. However, it can be appreciated that similar information can also be presented to the subject employee. The screen shot 120 also provides a status portion 126, which can include location information (e.g., remote working or office location at which that employee currently resides); a badges portion 128, which can be used to display awards, recognitions, qualifications, or other attributes that can be associated with an employee. In this way, a virtual or otherwise remote working environment can incorporate recognition that would traditionally be provided by trophies, plaques, certificates and the like to provide a richer view of that employee and their contributions and skillset. The screen shot 120 also includes a recent activity portion 130, which can be used to show location updates, department changes, joining a team, leaving a team, promotions or other pertinent changes to the data that can be periodically updated and augmented using the processes shown in FIGS. 3 and 4.

The screen shot 120 in FIG. 8 also includes an employee details portion 132, which can include name, gender, department, title, contact details, among other things. This allows alternative information and contact details to be provided through the data wrangling and scraping processes to provide the aforementioned single source of truth for this employee. Also shown in FIG. 8 are a manager portion 134 and a reports portion 136 that provide hierarchy details associated with the organization. For example, the employee's manager and a link to that manager's dashboard can be included by having access to the hierarchy reference data 58 shown in FIG. 4. Similarly, if that employee includes a team or other collection of one or more individuals that reports to them, this information and links to those individuals within the connections application 110 can be provided.

Figure 9:
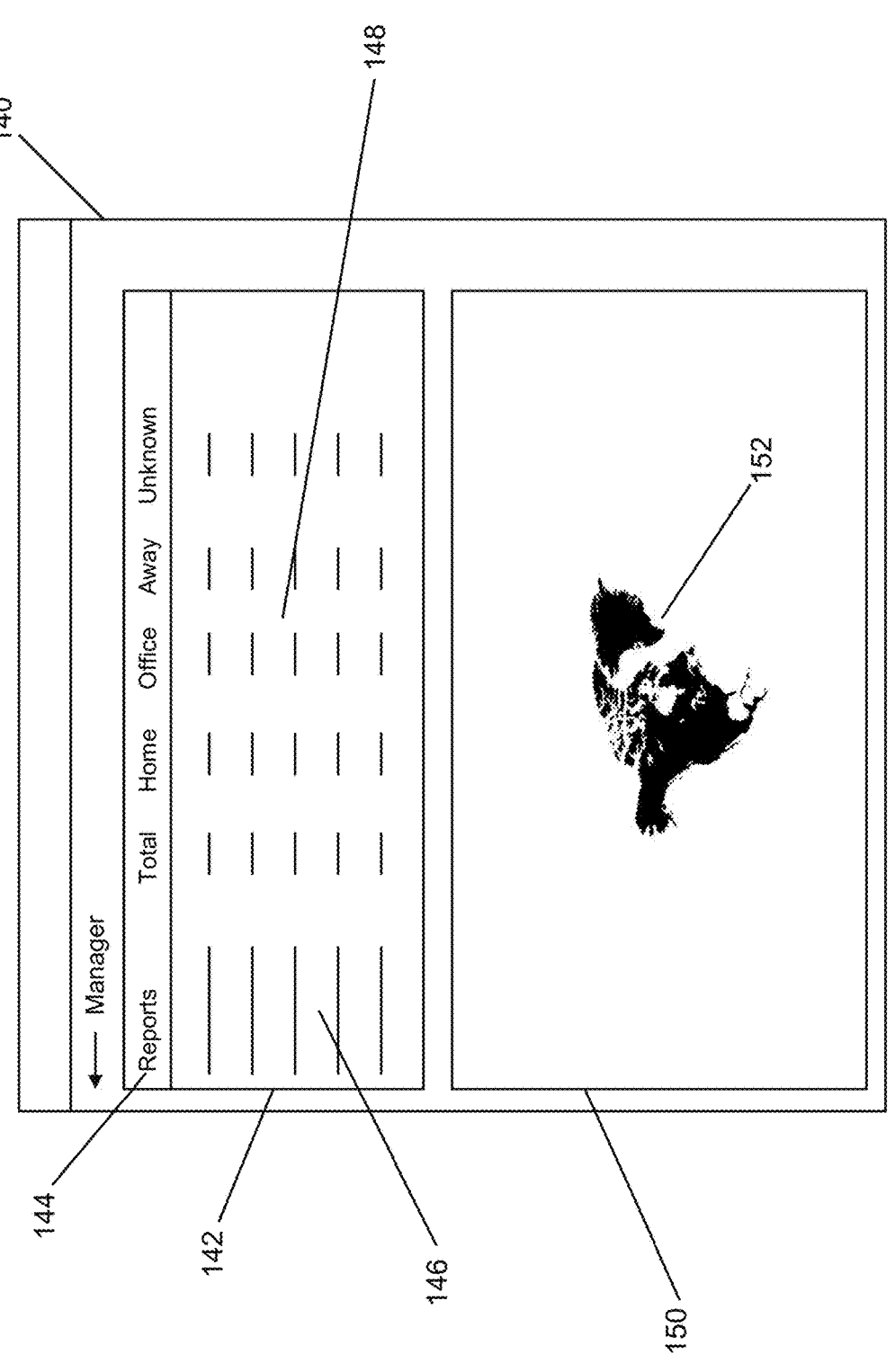
FIG. 9 is an example of a graphical user interface for displaying location-based data for a hierarchy of employees.

FIG. 9 provides a screen shot 140 of an example of a reports view, in this example for a manager. The reports view allows the platform 10 to provide visibility into hierarchies in the organization. In this example, the reports view includes a table 142 with a number of metrics 144 associated with each individual 146 in the organizational structure that reports to this manager. For example, in this case one can see who has checked in their location 148 and who has not. This can provide a real time ability to determine who is engaged within a team, etc. A locations portion 150 is shown with a map 152 to assist in visualizing who is currently residing where.

The location data 148 can also be tied to real-world security passes and automate aspects of "checking in" actions. The checking in feature is shown by the screen shot 160 shown in FIG. 10. The screen shot 160 provides an in office status with a message 162 to guide a user to selecting a building 164 and floor 166 in this example. It can be appreciated that other selections can be provided for remote workers. This allows the employee to update their status, availability, location, etc. in real time, which is fed into the platform 10 and updated within the organizational hierarchy.

Figures 10, 11:
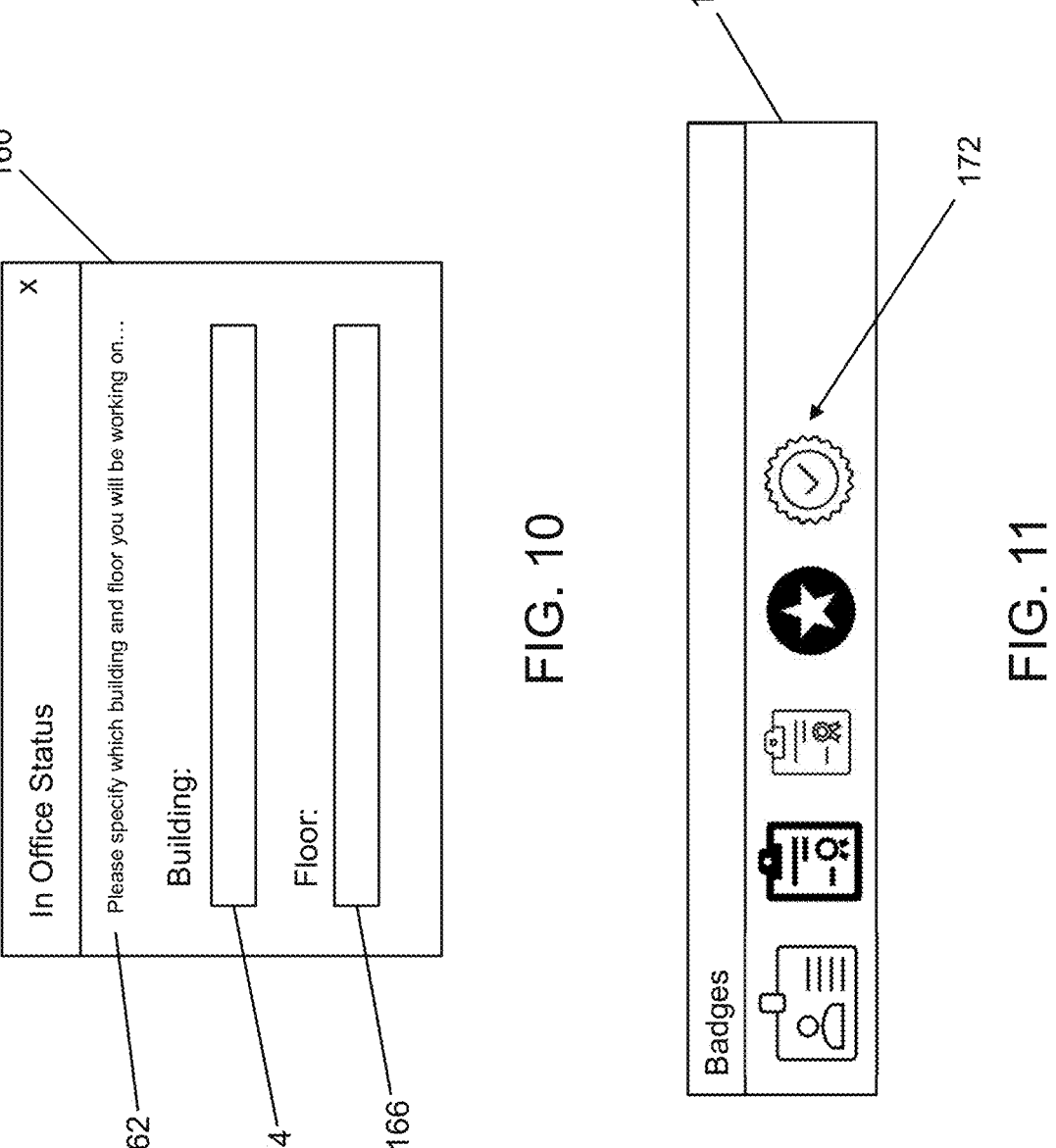
FIG. 10 is an example of a graphical user interface for a location entry tool.
FIG. 11 is an example of a graphical user interface for a badge display tool.

In addition to employee details, metadata and location data, as shown in FIG. 11 and discussed above, the platform 10 provides an area to allow personalization and recognition within the organization. These "badges" 172 can reflect accomplishments and qualifications that might otherwise not be known to others. The platform 10 can therefore leverage the virtual connectivity across the organization to build richer profiles of employees, teams, and the organizational structure more generally.

It can be appreciated that the connections application 110 can be implemented as a stand-alone application or as a module or tool provided within the enterprise application 108 and/or web browser application 112 to be interacted with by the user of the client device 12.

Referring to FIG. 12, an example embodiment of computer executable instructions for processing hierarchical data is shown. At block 200, the hierarchical connectivity platform 10 receives a first set of data from multiple sources, e.g., as shown in FIG. 4 wherein data from multiple departments within the organization provide data, such as HR, finance, IT, etc. This first set of data can be considered the enterprise client data 18 shown in FIG. 1. The first set of data is then processed at block 202 to generate a preliminary data file by combining data records to populate fields in the data file. For example, as shown in FIG. 3, the enterprise client data 18 can be wrangled or combined and cleansed in a first cleansing stage 40 (also illustrated in FIG. 4). The hierarchical connectivity platform 10 also receives a second set of data at block 204, which is obtained from one or more additional sources. For example, as shown in FIG. 3, such other client data 20 can be scraped from other programs, sites or sources to obtain the second set of data. The second set of data is then processed to update missing fields in the preliminary data file at block 206, e.g., by implementing the second data cleansing stage 48 as shown in FIG. 3. In this way, an output data file is generated at block 208, e.g., the updated master list 50 and/or updated master data files 66 to provide an authoritative single source of truth for the corresponding employee or user. This output data file is provided at block 210 to the hierarchical connectivity platform 10 to provide access to these fields and the corresponding data to other entities in the organization, e.g., as illustrated in FIGS. 8-11.

Figure 13:
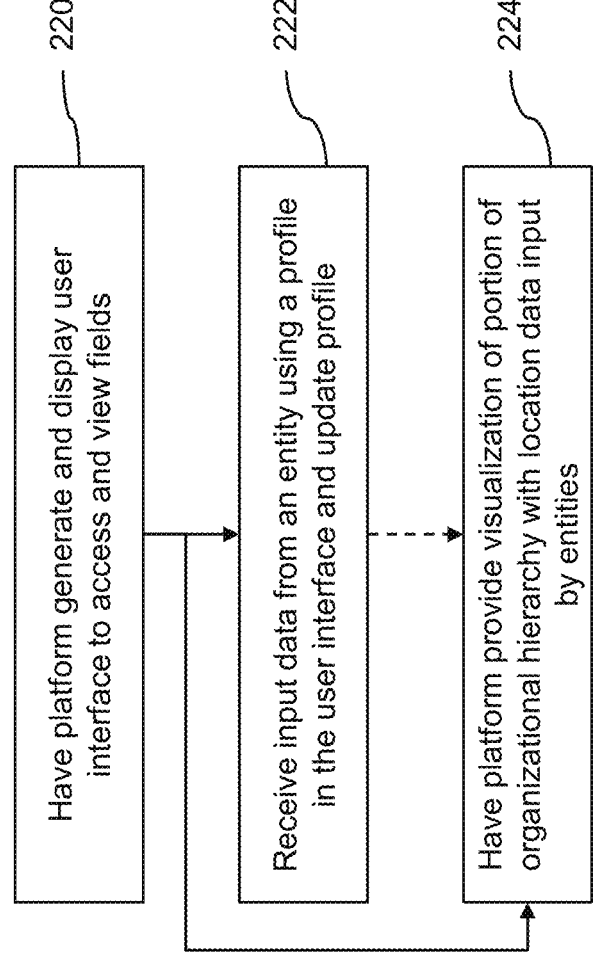
FIG. 13 is a flow diagram of an example of computer executable instructions for providing a graphical user interface for providing processed hierarchical data.

FIG. 13 provides an example embodiment of computer executable instructions executed by the hierarchical connectivity platform 10 to utilize the output data file in, for example, the connections application 110. At block 220, the hierarchical connectivity platform 10 can generate and display a UI to access and view the fields as illustrated in FIG. 8. From this dashboard or landing page, the connection application 110 can receive input data from an entity using a profile in the user interface and update the profile for that user at block 222. Also, the hierarchical connectivity platform 10 can provide a visualization of a portion of the organizational hierarchy with location data input by the entities, e.g., as shown in FIG. 9. The connections application 110 as accessed by the users and the server-based hierarchical connectivity application 26 as provided by or for the hierarchical connectivity platform 10, can therefore provide a central portal or dashboard for visualizing and interfacing with hierarchical data associated with an organization. The hierarchical data is advantageously assembled by wrangling, scraping and cleansing data to generate comprehensive data files and master lists for an organization that can be updated periodically and in real-time as users communicate, move and engage within the organization.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A device for presenting graphical user interfaces (GUIs) with processed hierarchical data, the device comprising:
a processor;
a communications module coupled to the processor; and
a memory coupled to the processor, the memory storing computer executable instructions that when executed by the processor cause the device to:
in association with rendering a graphical user interface (GUI) at an application layer of a platform providing access to fields associated with entities in an organizational hierarchy to other entities in the organizational hierarchy, execute operations, at a data layer of the platform, for data wrangling and data cleansing, the operations causing the device to:
receive a first set of data from a plurality of sources via the communications module, each source providing data records for the entities in the organizational hierarchy;
process, at the data layer, the first set of data to generate a preliminary data file for the entities by combining the data records to populate fields in the preliminary data file;
provide, at the data layer, a standalone hierarchical reference data set which includes hierarchical reference data defining different levels of status, of a plurality of levels of status, for different entities of the organizational hierarchy,
wherein processing the first set of data at the data layer blends the standalone hierarchical reference data set with a data source that includes individual entity data, wherein the processing of the first set of data at the data layer imparts hierarchical attributes within the hierarchical reference data set into the preliminary data file into which additional data is added to populate missing fields in the preliminary data file;
receive a second set of data from at least one additional source via the communications module, each additional source providing additional data records for the entities to populate at least some missing data in the preliminary data file by adding the additional data;
process, at the data layer, the second set of data by updating the missing fields in the preliminary data file for the entities with the additional data, and generating an output data file providing a single source of truth and comprising a list of the entities in the hierarchy with associated data fields for each entity; and
provide access to the output data file via the GUI, wherein the GUI interfaces with a hierarchical connectivity application at the application layer, the hierarchical connectivity application enabling the entities to access and view the fields associated with the entities in the organizational hierarchy via the GUI.

2. The device of claim 1, wherein the computer executable instructions further cause the processor to:
receive input data from an entity in the organizational hierarchy via the communications module, entered using a profile in the GUI; and
update the profile for the entity.

3. The device of claim 1, wherein the platform uses machine learning to analyze the hierarchical data.

4. The device of claim 2, wherein the computer executable instructions further cause the processor to:
have the platform provide a visualization of at least a portion of the organizational hierarchy with location data input by a plurality of the entities.

5. The device of claim 1, wherein the computer executable instructions further cause the processor to:
receive additional data associated with either or both the first data set and the second data set via the communications module; and
update the output data file by processing the additional data.

6. The device of claim 1, wherein:
the first set of data is provided by a plurality of departments in an enterprise comprising the organizational hierarchy; and
the second set of data is gathered from a source not associated with one of the plurality of departments in the enterprise.

7. The device of claim 6, wherein the second set of data is organized by a sub-hierarchy within the enterprise that is not associated with one of the plurality of departments.

8. The device of claim 1, wherein the computer executable instructions further cause the processor to:
enable entities to enter real time location data associated with premises in which they are working, the real time location data being confirmed with a security process.

9. The device of claim 1, wherein the computer executable instructions further cause the processor to:
have the platform display at least one badge in the user interface to recognize an attribute, qualification, or achievement associated with the entity, each badge being assigned by an enterprise comprising the organizational hierarchy.

10. A method of presenting graphical user interfaces (GUIs) with processed hierarchical data, the method executed by a device having a communications module and comprising:
in association with rendering a graphical user interface (GUI) at an application layer of a platform providing access to fields associated with entities in an organizational hierarchy to other entities in the organizational hierarchy, execute operations, at a data layer of the platform, for data wrangling and data cleansing, the operations comprising:
receiving a first set of data from a plurality of sources via the communications module, each source providing data records for the entities in the organizational hierarchy;
processing, at the data layer, the first set of data to generate a preliminary data file for the entities by combining the data records to populate fields in the preliminary data file;
providing, at the data layer, a standalone hierarchical reference data set which includes hierarchical reference data defining different levels of status, of a plurality of levels of status, for different entities of the organizational hierarchy, wherein processing the first set of data at the data layer blends the standalone hierarchical reference data set with a data source that includes individual entity data, wherein the processing of the first set of data at the data layer imparts hierarchical attributes within the hierarchical reference data set into the preliminary data file into which additional data is added to populate missing fields in the preliminary data file;
receiving a second set of data from at least one additional source via the communications module, each additional source providing additional data records for the entities to populate at least some missing data in the preliminary data file by adding the additional data;
processing, at the data layer, the second set of data by updating the missing fields in the preliminary data file for the entities with the additional data, and generating an output data file providing a single source of truth and comprising a list of the entities in the hierarchy with associated data fields for each entity; and providing access to the output data file via the GUI, wherein the GUI interfaces with a hierarchical connectivity application at the application layer, the hierarchical connectivity application enabling the entities to access and view the fields associated with the entities in the organizational hierarchy via the GUI.

11. The method of claim 10, further comprising:
receiving input data from an entity in the organizational hierarchy via the communications module, entered using a profile in the GUI; and
updating the profile for the entity.

12. The method of claim 10, wherein the platform uses machine learning to analyze the hierarchical data.

13. The method of claim 10, further comprising:
having the platform provide a visualization of at least a portion of the organizational hierarchy with location data input by a plurality of the entities.

14. The method of claim 10, wherein:
the first set of data is provided by a plurality of departments in an enterprise comprising the organizational hierarchy; and
the second set of data is gathered from a source not associated with one of the plurality of departments in the enterprise.

15. The method of claim 14, wherein the second set of data is organized by a sub-hierarchy within the enterprise that is not associated with one of the plurality of departments.

16. A non-transitory computer readable medium for presenting graphical user interfaces (GUIs) with processed hierarchical data, the computer readable medium comprising computer executable instructions for:
in association with rendering a graphical user interface (GUI) at an application layer of a platform providing access to fields associated with entities in an organizational hierarchy to other entities in the organizational hierarchy, execute operations, at a data layer of the platform, for data wrangling and data cleansing, the operations comprising:
receiving a first set of data from a plurality of sources via a communications module, each source providing data records for the entities in the organizational hierarchy;
processing, at the data layer, the first set of data to generate a preliminary data file for the entities by combining the data records to populate fields in the preliminary data file;
providing, at the data layer, a standalone hierarchical reference data set which includes hierarchical reference data defining different levels of status, of a plurality of levels of status, for different entities of the organizational hierarchy,
wherein processing the first set of data at the data layer blends the standalone hierarchical reference data set with a data source that includes individual entity data, wherein the processing of the first set of data at the data layer imparts hierarchical attributes within the hierarchical reference data set into the preliminary data file into which additional data is added to populate missing fields in the preliminary data file;
receiving a second set of data from at least one additional source via the communications module, each additional source providing additional data records for the entities to populate at least some missing data in the preliminary data file by adding the additional data;

processing, at the data layer, the second set of data by updating the missing fields in the preliminary data file for the entities with the additional data, and generating an output data file providing a single source of truth and comprising a list of the entities in the hierarchy with associated data fields for each entity; and providing access to the output data file via the GUI, wherein the GUI interfaces with a hierarchical connectivity application at the application layer, the hierarchical connectivity application enabling the entities to access and view the fields associated with the entities in the organizational hierarchy via the GUI.

17. The device of claim 1, wherein the GUI comprises a visual representation of at least one of a status or availability for a subset of entities related to an entity the visual representation was generated for.

18. The device of claim 1, wherein the GUI comprises a visual representation of a location for a subset of entities related to an entity the visual representation was generated for.

19. The method of claim 10, wherein the GUI comprises a visual representation of at least one of a status or availability for a subset of entities related to an entity the visual representation was generated for.

20. The method of claim 10, wherein the GUI comprises a visual representation of a location for a subset of entities related to an entity the visual representation was generated for.

* * * * *